United States Patent
Waggamon et al.

[19]

[11] Patent Number: 6,049,289
[45] Date of Patent: Apr. 11, 2000

[54] REMOTE CONTROLLED GARAGE DOOR OPENING SYSTEM

[75] Inventors: Dennis W. Waggamon, North Canton, Ohio; Willem J. Marneweck, Tempe, Ariz.; Vivien N. Delport, Phoenix, Ariz.; Frederick J. Bruwer, Chandler, Ariz.

[73] Assignees: Overhead Door Corporation, Dallas, Tex.; Microchip Technology, Inc., Chandler, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 08/706,682

[22] Filed: Sep. 6, 1996

[51] Int. Cl.$^7$ ....................................................... G06F 7/04
[52] U.S. Cl. ................................. 340/825.31; 340/825.34
[58] Field of Search .......................... 340/825.31, 825.69, 340/825.72, 825.34, 825.22, 825.56; 341/176, 173

[56] References Cited

U.S. PATENT DOCUMENTS

| | | | |
|---|---|---|---|
| Re. 29,525 | 1/1978 | Willmott | 325/37 |
| Re. 35,364 | 10/1996 | Heitschel et al. | 364/400 |
| 3,906,348 | 9/1975 | Willmott | 325/37 |
| 3,911,397 | 10/1975 | Freeny, Jr. | 340/147 |
| 4,037,201 | 7/1977 | Willmott | 340/167 |
| 4,178,549 | 12/1979 | Ledenbach et al. | 325/38 |
| 4,250,533 | 2/1981 | Nelson | 361/172 |
| 4,315,249 | 2/1982 | Apple et al. | 340/825.52 |
| 4,360,801 | 11/1982 | Duhame | 340/521 |
| 4,380,762 | 4/1983 | Capasso | 340/825.63 |
| 4,385,296 | 5/1983 | Tsubaki et al. | 340/825.72 |
| 4,426,637 | 1/1984 | Apple et al. | 340/825.65 |
| 4,509,093 | 4/1985 | Stellberger | 361/172 |
| 4,529,980 | 7/1985 | Liotine et al. | 340/825.52 |
| 4,535,333 | 8/1985 | Twardowski | 340/825.69 |
| 4,573,046 | 2/1986 | Pinnow | 340/825.56 |
| 4,574,247 | 3/1986 | Jacob | 329/126 |
| 4,581,606 | 4/1986 | Mallory | 340/539 |

(List continued on next page.)

FOREIGN PATENT DOCUMENTS

| | | | |
|---|---|---|---|
| 0153499A2 | 9/1985 | European Pat. Off. | E05B 49/00 |
| 0 311 112A2 | 12/1989 | European Pat. Off. | E05B 49/00 |
| 0335912 B1 | 3/1995 | European Pat. Off. | G07F 7/08 |
| 3336645 A1 | 4/1985 | Germany | E05F 15/20 |
| 55-20830 | 2/1980 | Japan | E05B 49/00 |
| 2133073 | 7/1984 | United Kingdom | E05B 47/00 |

*Primary Examiner*—Howard L. Williams
*Assistant Examiner*—Jean B. Jeanglaude
*Attorney, Agent, or Firm*—Akin, Gump, Strauss, Hauer & Feld, L.L.P.

[57] ABSTRACT

A remote control system for opening and closing a barrier, such as a garage door, includes an RF receiver and a plurality of RF transmitters. The transmitters and receiver include circuitry programmed to provide transmission of encrypted code signals each time the transmitters are used and employing a code hopping method which prevents unauthorized signal interception or code "grabbing". The system is operated in a code learning mode for the receiver by momentarily actuating a receiver learn mode button for receiving each transmitter identification code and a secret decryption key for that transmitter with the system automatically returning to the operate mode. Each transmitter identification and secret key code signal is automatically and randomly stored in an available and unused memory in the receiver circuitry. A multibit hopping code is transmitted from each transmitter to the receiver with each transmitter operation in the operate mode of the system and the hopping code changes with each transmission to prevent theft or code grabbing and resultant unauthorized operation of the system.

4 Claims, 5 Drawing Sheets

U.S. PATENT DOCUMENTS

| | | | |
|---|---|---|---|
| 4,590,470 | 5/1986 | Koenig | 340/825.31 |
| 4,596,985 | 6/1986 | Bongard et al. | 340/825.69 |
| 4,638,433 | 1/1987 | Schindler | 364/400 |
| 4,652,860 | 3/1987 | Weishaupt et al. | 340/539 |
| 4,665,397 | 5/1987 | Pinnow | 340/825.56 |
| 4,686,529 | 8/1987 | Kleefeldt | 340/825.69 |
| 4,723,121 | 2/1988 | van den Boom et al. | 340/825.31 |
| 4,737,770 | 4/1988 | Brunius et al. | 340/539 |
| 4,750,118 | 6/1988 | Heitschel et al. | 364/400 |
| 4,779,090 | 10/1988 | Micznik et al. | 340/825.31 |
| 4,835,407 | 5/1989 | Kataoka et al. | 307/10.5 |
| 4,847,614 | 7/1989 | Keller | 340/825.56 |
| 4,855,713 | 8/1989 | Brunius | 340/506 |
| 4,878,052 | 10/1989 | Schulze | 340/825.69 |
| 4,890,108 | 12/1989 | Drori et al. | 341/176 |
| 4,912,463 | 3/1990 | Li | 340/825.69 |
| 4,928,098 | 5/1990 | Dannhaeuser | 340/825.56 |
| 4,931,789 | 6/1990 | Pinnow | 340/825.56 |
| 4,951,029 | 8/1990 | Severson | 340/506 |
| 4,988,992 | 1/1991 | Heitschel et al. | 340/825.69 |
| 5,049,867 | 9/1991 | Stouffer | 340/426 |
| 5,053,701 | 10/1991 | Porkristl et al. | 324/207.26 |
| 5,055,701 | 10/1991 | Takeuchi | 307/10.2 |
| 5,103,221 | 4/1992 | Memmola | 340/825.31 |
| 5,144,667 | 9/1992 | Pogue, Jr. et al. | 380/45 |
| 5,148,159 | 9/1992 | Clark et al. | 340/825.22 |
| 5,224,163 | 6/1993 | Gasser et al. | 380/30 |
| 5,252,960 | 10/1993 | Duhame | 340/825.56 |
| 5,365,225 | 11/1994 | Bachhuber | 340/825.31 |
| 5,471,668 | 11/1995 | Soenen et al. | 340/825.72 |
| 5,517,187 | 5/1996 | Bruwer et al. | 340/825.3 |
| 5,635,913 | 6/1997 | Willmott et al. | 340/825.22 |
| 5,686,904 | 11/1997 | Bruwer | 340/825.3 |

REMOTE CONTROLLED GARAGE DOOR OPENING SYSTEM

FIELD OF THE INVENTION

This invention relates generally to garage door openers, more particularly to remotely controlled systems for opening and closing garage doors, gates and the like, and even more particularly to systems of this type which provide increased security from unauthorized access.

BACKGROUND OF THE INVENTION

The use of remote control systems to operate barriers, such as garage doors, gates and the like, is well known. Such remote control systems typically utilize hand held transmitters which emit encoded signals transmitted at radio frequencies to a receiver associated with an automatic door or gate operator. The receiver is effective to intercept and decode the transmitted signal and thus cause the actuation of the operator to open or close the door or gate. These systems include the type in which the receiver has code switches which can be manually set to correspond to the authorized transmitter codes or, alternatively, may be "learn" type systems in which codes or the like used to identify authorized transmitter codes are initially stored in the receiver during a preparatory program or learn mode.

The risk of unauthorized access is a major concern associated with the use of the above mentioned systems. For example, unauthorized access can potentially be achieved by means of an exhaustive, systematic search in which a large number of different codes are successively transmitted in the hope that, eventually, one of the transmitted codes will match the authorized code and activate the system. Another scheme used to gain unauthorized access is a technique, sometimes referred to as "code grabbing", in which the initial transmission of the authorized code is electronically intercepted and stored for later unauthorized use.

Many of the prior art remote control systems have been susceptible to unauthorized access by one or both of the above described methods. For example, U.S. Pat. No. 4,750,118 issued Jun. 7, 1988 to Heitschel et al. discloses one type of "learn" remote control system for operating a garage door opener, but one particularly susceptible to code grabbing, in that each transmitter unit of the disclosed system has its own unique, but non-changing code. Accordingly, since each transmitter unit sends the exact same coded signal to activate the door operator every time it is used, the system of the Heitschel et al. patent is vulnerable to having the code intercepted and later used to gain unauthorized access.

The system of the type disclosed in the Heitschel et al. patent has additional disadvantages which inhibit its effectiveness. For example, the means used to transfer between the program (learn) mode and the operate mode comprises a two-position mechanical switch disposed on the operator power head housing suspended from the garage ceiling, and which must be manually moved between program and operator positions to place the receiver in either the "learn" or "operate" mode. Moreover, the means used to enable receiver storage of codes from different transmitters is also a multi-position mechanical switch which must be manually moved to the desired position prior to receipt of the particular transmitter code. Such arrangements are awkward and inconvenient and, as will be appreciated by those skilled in the art, potentially unreliable.

Barrier (garage door or gate) control systems which use a technique known as code hopping or code stepping are also known and have been previously described and used as a means for preventing unauthorzed access by so-called "code grabbing". In accordance with this code hopping technique, the code that activates the system changes (i.e., steps or hops) after each use. For example, one particular advantageous form of code hopping is described in U.S. Pat. No. 5,517,187 to Bruwer et al., assigned to an assignee of the present invention. However, a code hopping technique in accordance with the present invention as well as the manner by which it is incorporated with the design and operation of the remote system itself, uniquely distinguishes the total system of the present invention from prior art systems.

Accordingly, a need for further improvements in remote controlled door and gate operator systems has continued to be felt.

It is therefore a principal object of the present invention to provide a new and improved remote control door and gate operating system. Another object is to provide such a remote control operating system with improved means for preventing unauthorized access, including code grabbing. A still further object of the invention is to provide such a system which avoids the disadvantages and inconveniences associated with prior art systems utilizing mechanical or manually actuated switches.

Other objects and advantages of the invention will become apparent from the following specification, accompanying drawings and claims.

SUMMARY OF THE INVENTION

In accordance with a key feature of the present invention, a form of code hopping embodying a unique sequential decryption/comparison technique is incorporated into the operation of a remote control system for activating barrier opening apparatus, particularly garage door or gate openers. In addition, the remote control system is of a "learn" type, but one in which the authorized operating codes stored in the receiver during the learn mode are never themselves transmitted from the transmitter.

Broadly stated, the remote control system of the present invention comprises one or more RF transmitters and a digital type RF receiver associated with the door operator. The receiver is initially programmed with a "manufacturer's key" value. Every system produced by a given manufacturer has the same manufacturer's key. In addition, each transmitter is initially programmed with a unique serial number and unique "secret key". The secret key stored in the transmitter is generated using the unique serial number of the transmitter and the manufacturer's key. Thus, every transmitter has a different serial number and a different secret key. When the transmitter is activated, it performs a nonlinear encoding function using the secret key to generate a changeable hopping code signal. The hopping code changes (i.e., hops) every time the transmitter is activated.

The transmitter's unique secret key is never transmitted, and although the transmitter's unique serial number is transmitted, it is not stored in the receiver. In accordance with a feature of the invention, the secret key value which is stored in the receiver is self-generated in response to the encoded transmission from the transmitter during the program or learn mode of the receiver. During the subsequent operate mode, the receiver then uses the previously generated and stored secret key to decode the hopping code signal from the transmitter. The door operator or opener device is activated when such decoded information is within a "window" or range of acceptable values as determined by a sequential comparison technique subsequently described.

In accordance with other unique features of the system of the invention, the transition of the receiver between the operate mode and the learn mode is effected by means which momentarily places a microprocessor associated with the receiver in the learn mode, followed by the automatic return of the microprocessor to the operate mode without any further action required of the user. In addition, the system of the present invention enables a technique of random storage in unused receiver memory to accommodate codes from different transmitters rather than requiring the receiver to be "switched" to a different memory location for a given transmitter.

The present invention also provides a remote control door or gate operating system which is more convenient to operate, in all modes, than prior art systems. Those skilled in the art will further appreciate the invention upon reading the detailed description which follows in conjunction with the drawings.

BRIEF DESCRIPTION OF THE DRAWINGS

The invention will now be described, by way of a non-limiting example, with reference to the accompanying drawings in which.

DETAILED DESCRIPTION OF THE PREFERRED EMBODIMENT

Figure 1:
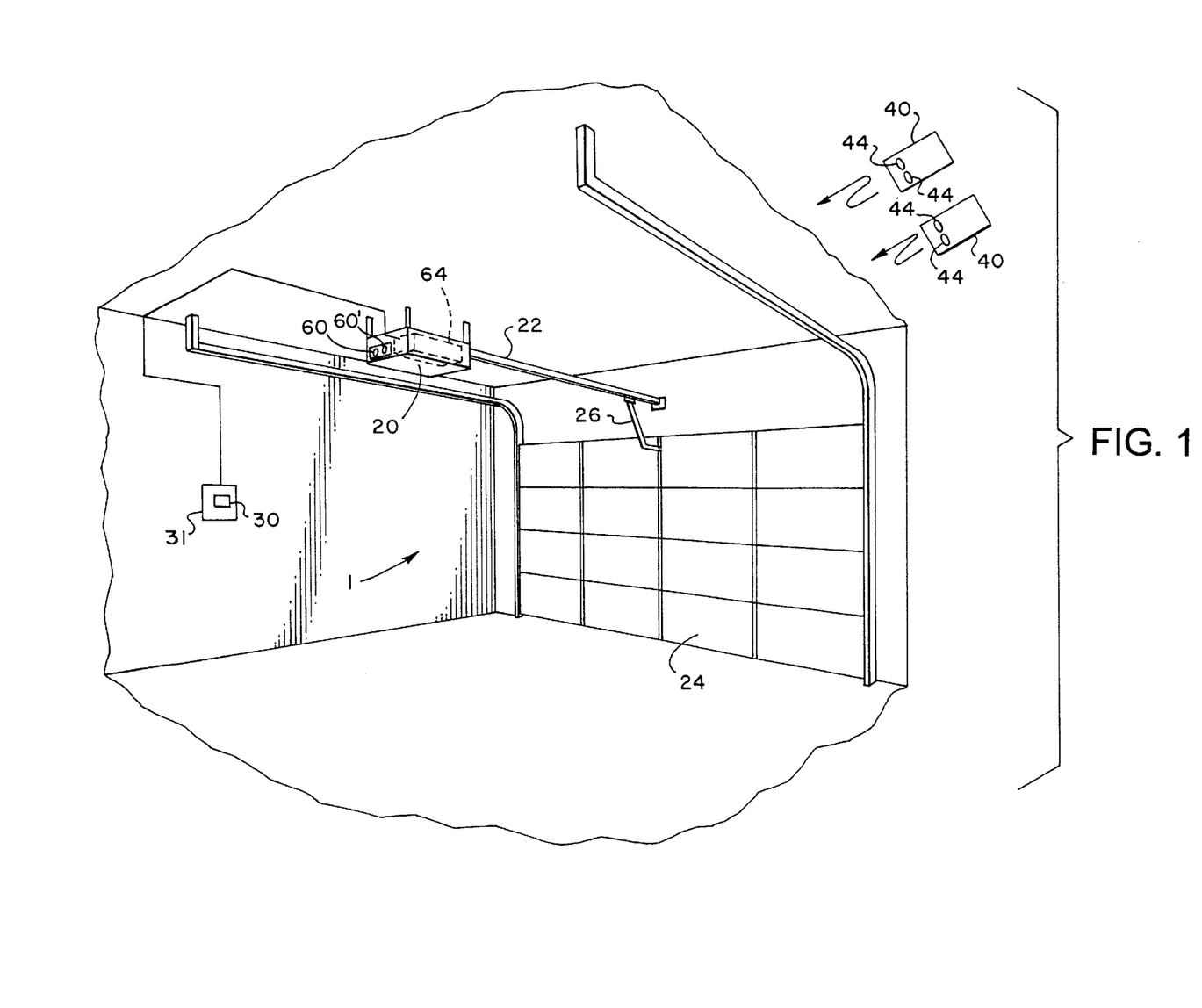
FIG. 1 is an illustration of a remote controlled garage door operating system of the type in which the present invention is incorporated.

FIG. 1 shows an embodiment of a remote controlled garage door system 1 of the present invention used for remotely automatically activating (opening and closing) a garage door. The system described hereinafter can also be used as a remote control system for actuating a gate or virtually any other type of movable barrier. System 1 comprises a plurality of transmitters 40 and power head operator 20 normally suspended from the ceiling of the garage. Rail 22 extends from power head 20 and is secured to the wall above the garage door 24. A first end of door arm 26 is joined to door 24, and a second end of door arm 26 is adapted to reciprocate along the length of rail 22. Power head 20 contains a drive mechanism 64, as is known in the art, for reciprocatively moving arm 26 (by chain not shown) along rail 22 for opening and closing garage door 24.

The drive mechanism 64 can be activated in conventional fashion by pressing button 30 of wall unit 31. Alternatively, the drive mechanism 64 can be remotely activated by one of the transmitters 40 which, upon actuation, transmit coded radio frequency signals to a receiver 42 (FIG. 2) in power head operator 20, all conventionally known.

The system of the present invention is a learn type system by which the receiver 42 is effected to alternate between a program or learn mode, during which codes or coded values are created and stored which will be used to identify authorized transmitter codes, and an operate mode during which the said identification process is carried out.

Figure 2:
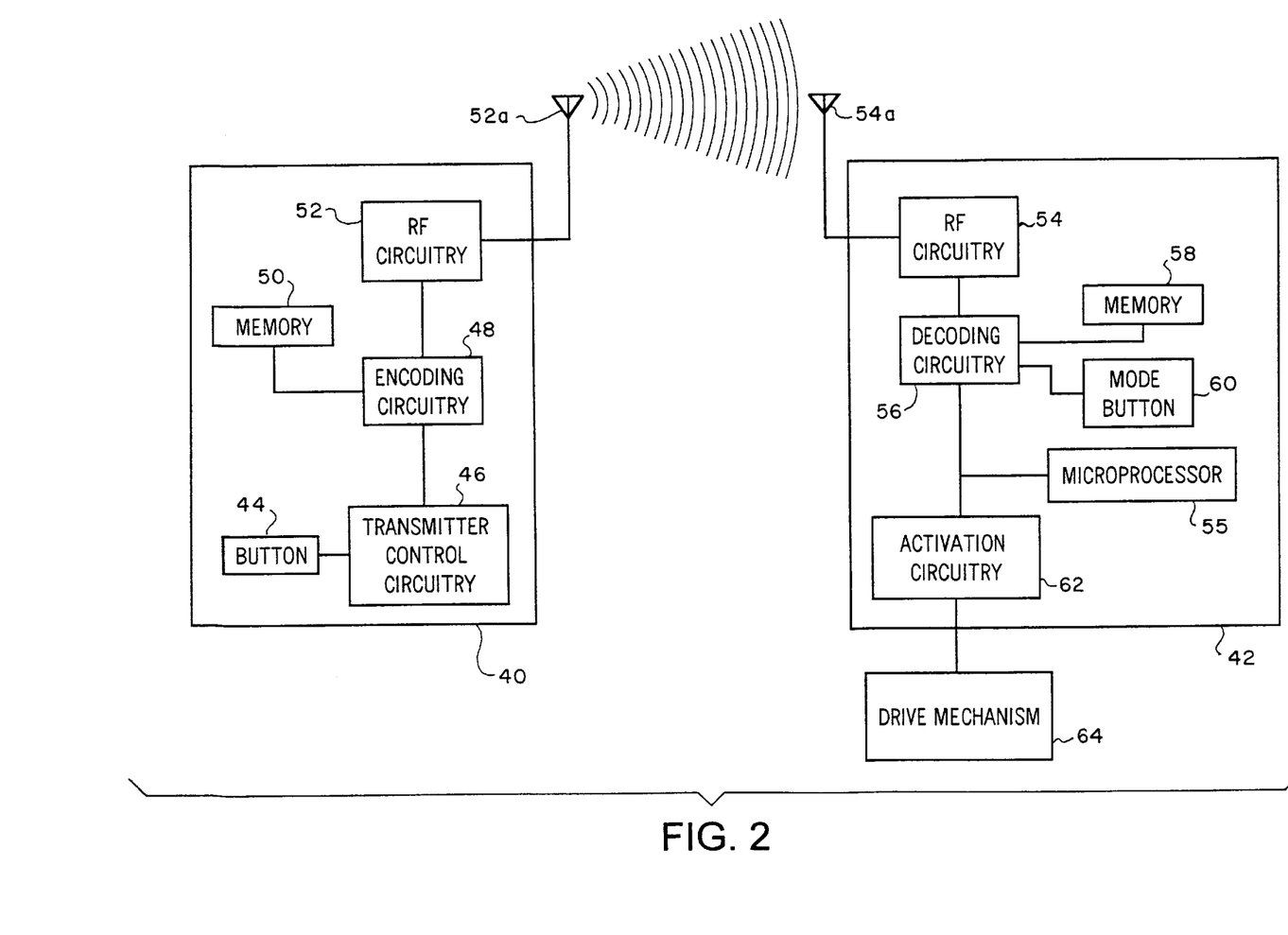
FIG. 2 are block diagrams of a transmitter and receiver of the system of the present invention.

With reference to FIG. 2, each transmitter 40 can be activated by buttons 44, which are operable to cause the transmitter to perform various functions. In the preferred embodiment, each transmitter comprises up to four buttons 44 with various functions described in more detail below. Each transmitter 40 contains transmitter control circuitry 46 (which can be a custom integrated circuit), encoding circuitry 48, memory 50, and RF transmitter circuitry 52 including a suitable antenna 52a for generating and transmitting an encoded transmission signal. The receiver 42 contains RF tuning circuitry 54 connected to a suitable receiving antenna 54a, decoding circuitry 56, memory 58 and activation circuitry 62 to activate drive mechanism 64 in response to the identification of an authorized transmitter code. In addition, as described below in greater detail, a learn mode button 60 can be used by the operator to initiate the learn mode of the receiver. As shown in FIG. 2, a microprocessor 55 of conventional design and construction is used for controlling the operation of receiver 42.

The transmitter 40 is operable to transmit an encrypted hopping code signal that changes with each transmission. The receiver 42 is operable to receive and decrypt the encyted hopping code signal and to activate drive mechanism 64 when the decrypted signal identifies the presence of an authorized transmitter code. The encoding and decoding functions reactively performed by the encoding circuitry 48 and decoding circuitry 56 employ novel variations of the code hopping technique disclosed in U.S. Pat. No. 5,517,187 to Bruwer, et al., which by this reference is incorporated herein for all purposes.

Initial Programming

By way of example, each transmitter 40 is initially programmed with the following: (a) a twenty-four bit "serial number", (b) a sixty-four bit "secret key", (c) a "check" value and (d) an initial synchronization value. Each transmitter has a unique twenty-four bit serial number and a unique sixty-four bit "secret key". The check value is simply a fixed value, and it remains the same for each transmission of the transmitter 40. The synchronization value is a sixteen bit binary number which increments, in this preferred embodiment by one, every time the transmitter 40 is actuated. The initial synchronization value stored in every transmitter is zero, although it can be any number.

Figure 3:
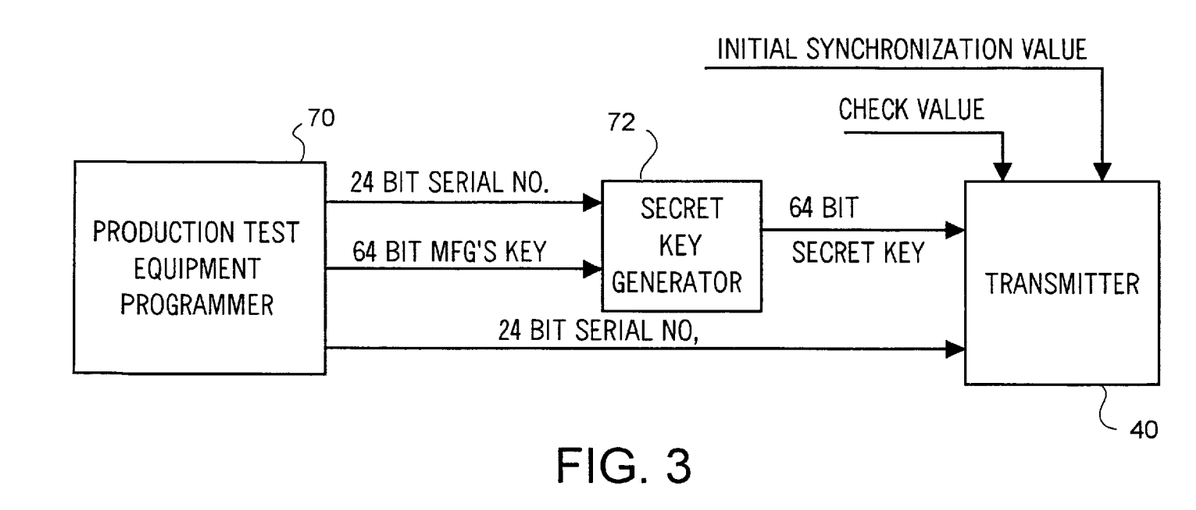
FIG. 3 is an illustration of the data flow related to the initial programming of a transmitter in accordance with the principles of the present invention.

With reference to FIG. 3, a nonlinear function is used to generate the sixty-four bit "secret key" that is stored in a transmitter 40. The inputs to the nonlinear function are (a) the unique twenty-four bit serial number for the particular transmitter and (b) a sixty-four bit "manufacturers key". The same sixty-four bit "manufacturers key" is used to program each transmitter. The nonlinear function uses the "manufacturer's key" and the serial number to generate a unique sixty-four bit "secret key" which is stored in the transmitter. The unique serial number is also directly stored in the transmitter 40.

Figure 4:
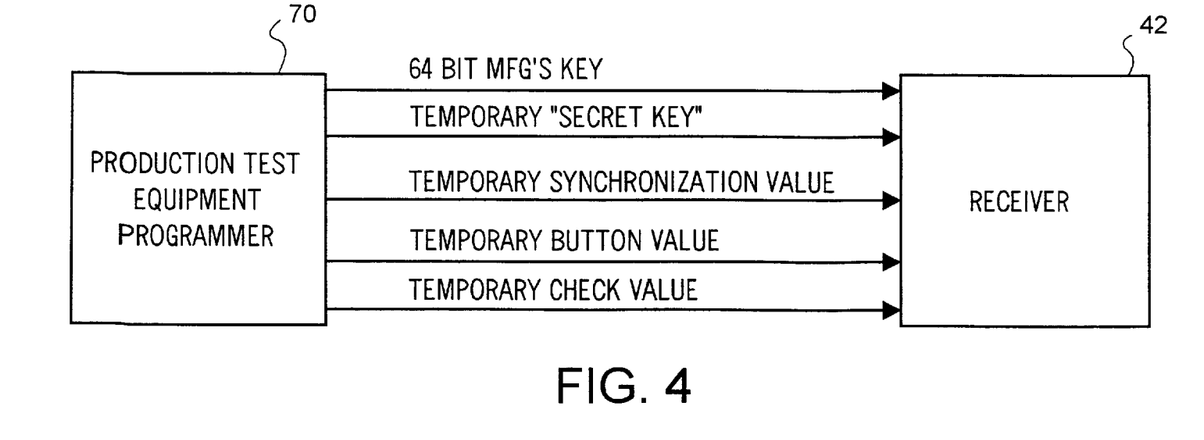
FIG. 4 is an illustration of the data flow related to the initial programming of the receiver in accordance with the principles of the present invention.

With reference to FIG. 4, there is now described the initial programming of the receiver 42. The receiver 42 is initially programmed with the sixty-four bit "manufacturers key". The receiver 42 is also programmed with (1) a temporary sixty-four bit "secret key", (2) a temporary synchronization value, (3) a temporary button value and (4) a temporary check value at the factory for test purposes. However, this temporary sixty-four bit "secret key" and the other temporary values do not correspond to those of any particular transmitter 40.

The Encryption/Decryption Process

The encrypton process is used to generate a thirty-two bit changeable hopping code which is transmitted by each transmitter to the receiver 42. The encryption process is carried out by the encoding circuitry 48 using a code hopping non-linear function.

Figure 5:
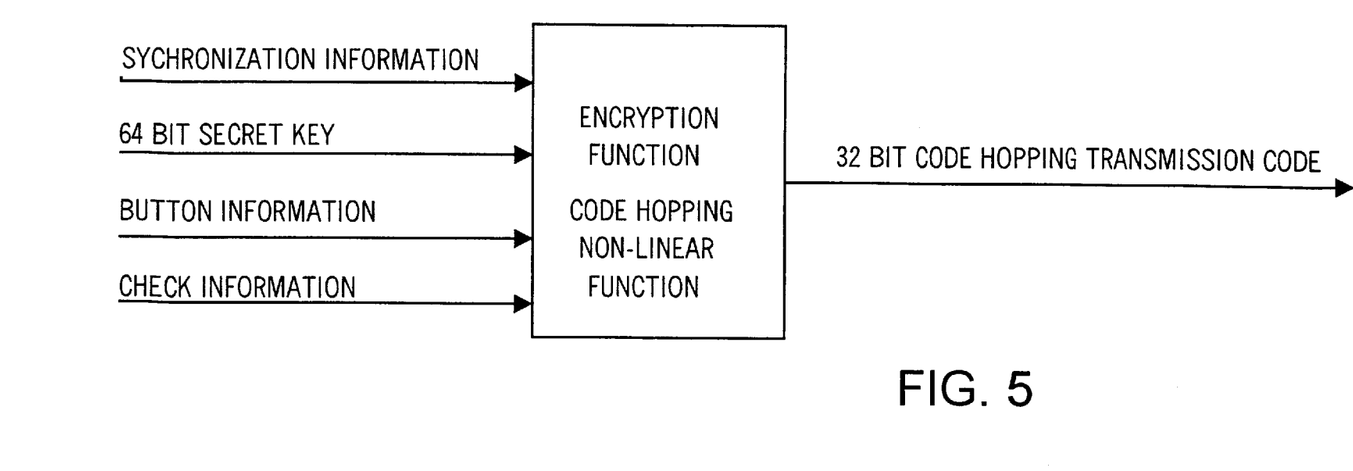
FIG. 5 is an illustration of the data flow associated with the encryption function in accordance with the principles of the present invention.

Referring to FIG. 5, the inputs for the code hopping non-linear function are illustrated. The inputs include: (a) the sixty-four bit "secret key" for the particular transmitter, (b) the synchronization value, (c) the button value and (d) the "check" value. The sixty-four bit "secret key", the synchronization value and the check value are the same as those described above.

The so-called button value is used to distinguish between the various buttons 44 on the transmitter. The transmitter 40 in the present embodiment of the invention can have up to four separate buttons 44 that can be pressed by the user. The additional buttons can be used to control other devices, such as gates, lights and other door operators. The button value is not programmed by the manufacturer because it is built into the hardware.

The output from the non-linear function is a thirty-two bit hopping code. Since the synchronization value changes each time the button 44 of the transmitter is pressed, the thirty-two bit hopping code changes with each transmission by the transmitter 40.

Figure 6:
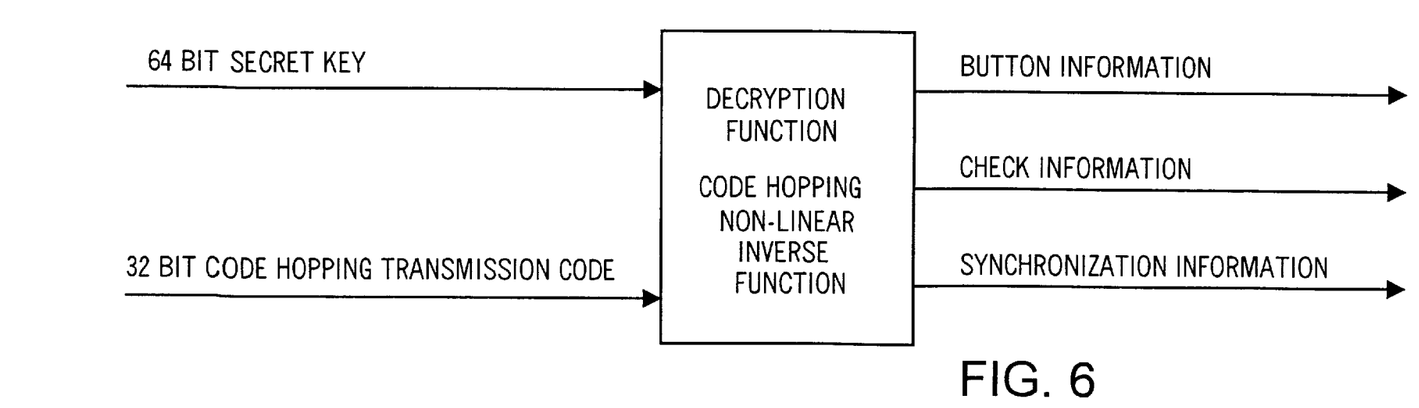
FIG. 6 is an illustration of the data flow associated with the decryption function in accordance with the principles of the present invention.

The decryption process is performed by the decoding circuitry 56 located in the receiver 42. With reference now to FIG. 6, the decryption process is performed using a code hopping non-linear function. The inputs for the non-liner function are: (a) the sixty-four bit "secret key" which will correspond to the one in the transmitter and (b) the thirty-two bit hopping code received from the transmitter. The sixty-four bit "secret key" is generated and stored in the memory 58 used by the decoding circuitry 56 of the receiver 42 by means of an algorithm during the learn mode as explained below. The outputs from the code hopping non-linear inverse function are (a) the synchronization value (b) the button value, and (c) the check value. These three values correspond to those associated with the transmitter 40 from which the thirty-two bit hopping code was received.

Data Formats

Figure 7A:
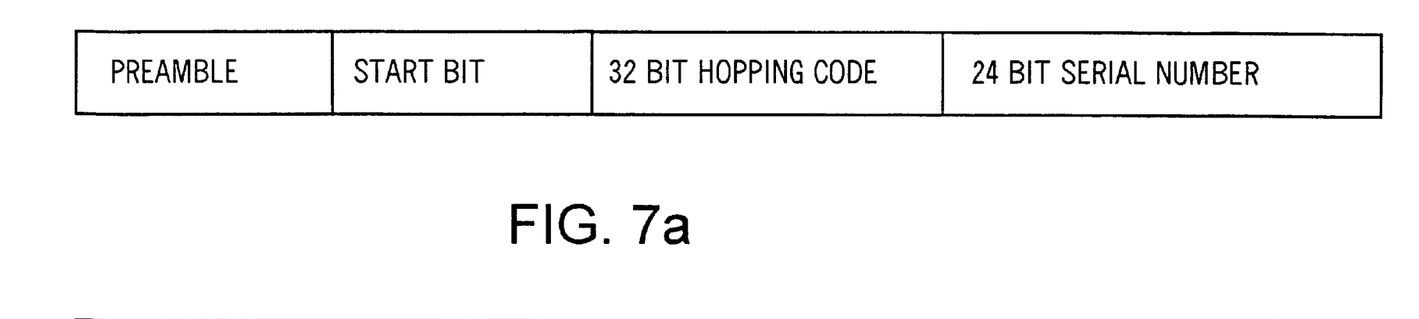
FIG. 7a is an illustration of the data format of the coded signal transmitted by the transmitters of the system of the present invention.

FIG. 7a is an illustration of the data format of the coded signal transmitted by a transmitter 40. The same data format is always transmitted, regardless of whether the system is in the learn mode or the operate mode. The changeable thirty-two bit hopping code changes with each transmission.

The twenty-four bit serial number is unique to each particular transmitter 40, is stored in the transmitter 40 during the initial programming and does not change from one transmission to the next. The preamble and start bit are the same for each transmission.

Figure 7B:
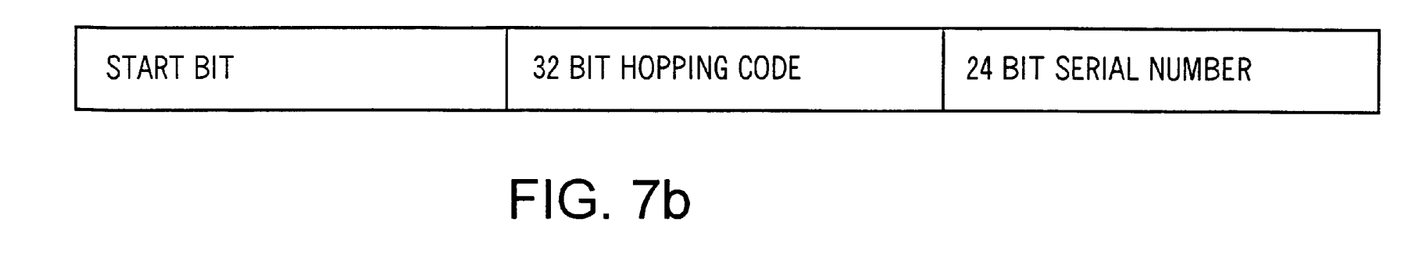
FIG. 7b is an illustration of the data format of the coded signal utilized by the receiver of the system of the present invention when operating in the program or learn mode.

The data format of the codes used for processing in the receiver 42 varies depending upon whether the receiver 42 is in the learn mode or the operate mode. FIG. 7b is an illustration of the data format of the coded signal used for processing in the receiver 42 in its learn mode. The twenty-four bit serial number is the unique, nonchanging serial number that was stored in the particular transmitter 40 (i.e., the one transmitting) during the initial programming. As was discussed above, the thirty-two bit hopping code is different for each transmission by the transmitter 40.

Figure 7C:
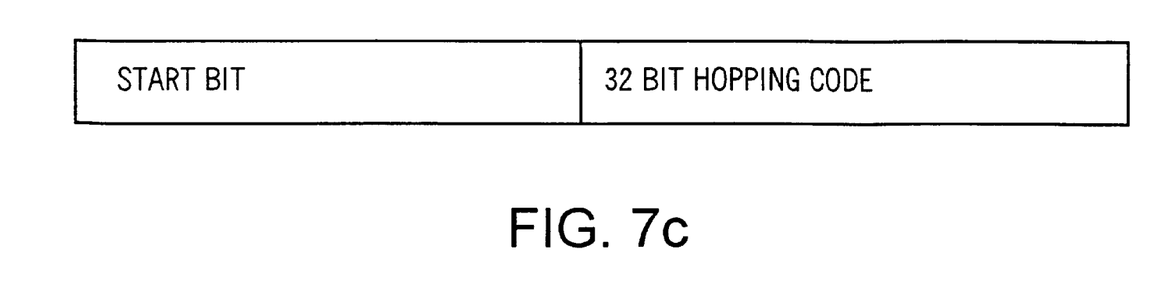
FIG. 7c is an illustration of the data format of the coded signal utilized by the receiver of the system of the present invention when operating in the operate mode.

FIG. 7c is an illustration of the data format of the coded signal used for processing by the receiver during its operate mode. The thirty-two bit hoping code received by the receiver 42 during the operate mode changes with each transmission. The twenty-four bit serial number transmitted by the transmitter 40 is not used by the receiver 42 during the operate mode.

Conditioning the Receiver Between the Operate Mode and the Learn Mode

A learn mode button 60 and a flash indicator 60' are located on the exterior of power head 20, as shown in FIG. 1. The learn mode button 60 is connected to circuitry 56 in the receiver 42 and is used to place the microprocessor 55 in the learn mode. Before learn mode button 60 is pressed, the microprocessor remains in the operate mode. When the learn mode button 60 is pressed and released, the microprocessor 55 and related circuitry is placed in the learn mode for a predetermined period of time, for example thirty seconds, sufficient to allow the specific transmitter information to be received, calculated and processed.

When the learn mode button 60 is pressed and released, the flash indicator 60' flashes, normally approximately two times per second, to show that the processor circuitry (and the system) is in the learn mode. The user of the system then presses the transmitter button 44 within the predetermined thirty second period, and the flash indicator 60' remains illuminated (i.e., does not flash) to show that the specific information from the transmitter is being received and processed.

The user must then press the transmitter button 44 again within a second predetermined period of time (e.g, thirty seconds) to confirm the information for the transmitter 40. The flash indicator 60' will turn off when the information has been received and has been confirmed. The microprocessor 55 then automatically returns to the operate node when the information has been confirmed, without the user pushing any button or taking any action.

Learn Mode

During the learn mode, the receiver 42 intercepts the thirty-two bit hopping code and the twenty-four bit serial number from the transmitter 40. The twenty-four bit serial number (received from the transmitter) and the sixty-four bit manufacturer's key (stored in the receiver at the factory) are then used to independently generate a sixty-four bit "secret key" that is identical to the sixty-four bit "secret key" of the particular transmitter.

The independently generated sixty-four bit "secret key" and the thirty-two bit hopping code received from the transmitter are then provided as inputs for the non-linear inverse code hopping function to decrypt the thirty-two bit hopping code and thus generate (1) a synchronization value, (2) a button value and (3) a check value. Finally, the independently generated sixty-four bit "secret key", the generated synchronization value, and the generated button and check values according to information from the particular transmitter are stored in an unused location. The twenty-four bit serial number is not stored.

In accordance with a unique feature of the invention, the processing circuitry of the receiver automatically stores the sets of generated secret keys, synchronization, button and check values corresponding to the respective transmitters, randomly, and in unused locations within the memory 58. There is therefore no need to devise any type of means to "switch" between dedicated sections of memory in the receiver for respectively different transmitters.

More specifically, there are a total of seven "locations" in memory 58 for storing information corresponding to each transmitter in the receiver 42. Thus, such embodiment can be used with up to seven different transmitters per receiver. When the information corresponding to particular transmitter 40 is intercepted by the receiver 42, the receiver processing circuitry generates and stores its sixty-four bit "secret key" and the other information corresponding to that transmitter randomly in an unused memory location in the memory 58. If all seven memory locations are used, then information in one of the seven memory locations will be eased and replaced with the new information. Thus, the system of the present invention does not require an external, manually actuated switch for selecting the precise memory location in which the received "secret key" and the other information is to be stored.

Finally, the system of the present invention has an "erase-all" feature, which allows the user to erase all seven memory locations in the receiver memory 58. The "erase all" feature is activated by pressing the learn mode button 60 and holding it pressed for a minimum of eight seconds. After performing the erase-all routine, all seven memory locations will be available, and it will be necessary to proceed through the learn mode steps again for each transmitter used with the system.

The Operate Mode

During the operate mode, the receiver 42 receives only the thirty-two bit hopping code transmitted by the transmitter 40. The system then sequentially decrypts the received hopping code using each sixty-four bit "secret key" that is stored in its memory 58.

More specifically, a first stored sixty-four bit "secret key" is used to decrypt the thirty-two bit hopping code, and the following checks are performed (in the order shown) to determine the validity of the decrypted code:

(1) The decrypted check value is compared to the stored check value to make sure they match exactly.

(2) The decrypted synchronization value is compared to the stored synchronization value. The decrypted synchronization value must fall within a "window" or range of acceptable values. The window is (ssv+1) to (ssv+15), where "ssv" is the stored synchronization value.

(3) The decrypted button value is compared to the stored button value to make sure they match exactly.

If any of the checks fail, a second stored sixty-four bit "secret key" is used to once again decrypt the thirty-two bit hopping code received from the transmitter 40. If this decryption also fails, a third stored sixty-four bit "secret key" is used to once again decrypt the thirty-two bit hopping code.

If all stored sixty-four bit "secret keys" fail, then the received thirty-two bit hopping code is determined not to be from an authorized transmitter, and the drive mechanism 64 will not be activated. However, if one of the stored sixty-four bit "secret keys" successfully decrypts the received thirty-two bit hopping code, the drive mechanism 64 is activated.

Finally, it is important to note that, since the window or range of acceptable values for the synchronization value is (ssv+1) to (ssv+15), the system of the present invention will not operate if the transmitter 40 transmits the same code hopping signal on two successive occasions.

The Auto-Synchronization Routine

If the button switch 44 of a transmitter 40 is pressed more than a predetermined number of, say fifteen times when the transmitter 40 is out of the radio range of the receiver 42, the transmitter 40 and the receiver 42 will no longer be synchronized. The system of the present invention advantageously employs a procedure, called an auto-synchronization routine, for dealing with this problem.

When the receiver 42 receives a transmission from an "out-of-sync" transmitter 40, the sixty-four bit "secret key" will successfully decrypt the thirty-two bit hopping code, and the resulting decrypted check value will match the stored check value for the transmitter. However, the decrypted synchronization value will not fall within the window of acceptable values, and the system will therefore not actuate the garage door or other barrier operator.

The microprocessor 55 recognizes that the check values did match, however, and it temporarily stores the decrypted synchronization value. The microprocessor 55 then awaits a second transmission, which is highly likely since the door did not actuate on the first transmission.

Upon receiving a second transmission from the out-of-sync transmitter, the microprocessor 55 will compare the decrypted synchronization value with the one that was temporarily stored from the previous transmission. If it is within a second, smaller window of acceptable values, then the system will operate the door, and the synchronization value stored in the receiver 42 for that transmitter will be reset to restore synchronization between the receiver 42 and the transmitter 40. The smaller window of acceptable values is (tssv+1) to (tssv+3), where "tssv" is the temporarily stored synchronization value from the previous transmission.

While the present invention has been described in connection with the preferred embodiment, it is not intended to limit the invention to the particular form set forth, but on the contrary, it is intended to cover such alternatives, modifications, and equivalents as may be included within the spirit and scope of the invention as defined by the appended claims.

What is claimed is:

1. A remote controlled garage door opening and closing system, comprising:

(a) a set of multiple radio frequency transmitters from a designated manufacturer represented by a manufacturer's key, each transmitter of said set having stored therein a transmitter identifying code comprising a serial number code portion unique to that transmitter, a secret key code portion unique to that transmitter, a synchronization value code portion which increments each time the transmitter is actuated, and a non-linear function generator for generating a multi-bit hopping code which changes each time the transmitter is actuated, each transmitter transmitting a coded signal representative of the hopping code and the serial number code portion;

(b) a receiver comprising a microprocessor operable between a learn mode and an operate mode, and memory having discrete locations for storing information respectively corresponding to each transmitter;

(c) said receiver having said manufacturer's key stored in the receiver at the factory, the receiver receiving the hopping code and the serial number code portions transmitted during the learn mode, with said stored manufacturer's key and the received serial number code portion associated with a transmitter used to independently generate in the receiver a secret key, and thereafter a synchronization value, corresponding to the secret key code portion and synchronization value of the particular transmitter;

(d) processing circuitry within the receiver storing, during the learn mode, the so-generated secret key and so-generated synchronization value, randomly in an unused discrete memory location, or if all said discrete memory locations are used, then by replacing the information in the randomly chosen memory location with the new information; and (e) said receiver, during the operate mode, (i) performing a non-linear decoding function on the intercepted hopping code using one of said stored secret keys, thereby to generate a second synchronization value, (ii) comparing said second synchronization value with said stored synchronization value and generating a command signal when said second synchronization value bears, and is within a window of, a predetermined relationship with said stored synchronization value (iii) in the absence of said predetermined relationship, performing another non-linear decoding function on the intercepted hopping code using a different one of said stored secret keys to generate another second synchronization value, and (iv) continually repeating the sequence until a second synchronization value is found which bears the said predetermined relationship with said stored synchronization value.

2. The system as defined by claim 1 in which the secret key code portion unique to each transmitter is generated as a non-linear function of the serial number code portion and the manufacturer's key.

3. The system as defined by claim 1 in which the serial number code portion plays no role during the operate mode.

4. The system as defined by claim 1, further comprising a mechanism operably connected to a garage door to open or close said door in response to said command signal.

* * * * *